G. E. KIRK.
HUMIDITY GOVERNOR.
APPLICATION FILED MAR. 6, 1912.
1,175,152.
Patented Mar. 14, 1916.
4 SHEETS—SHEET 4.
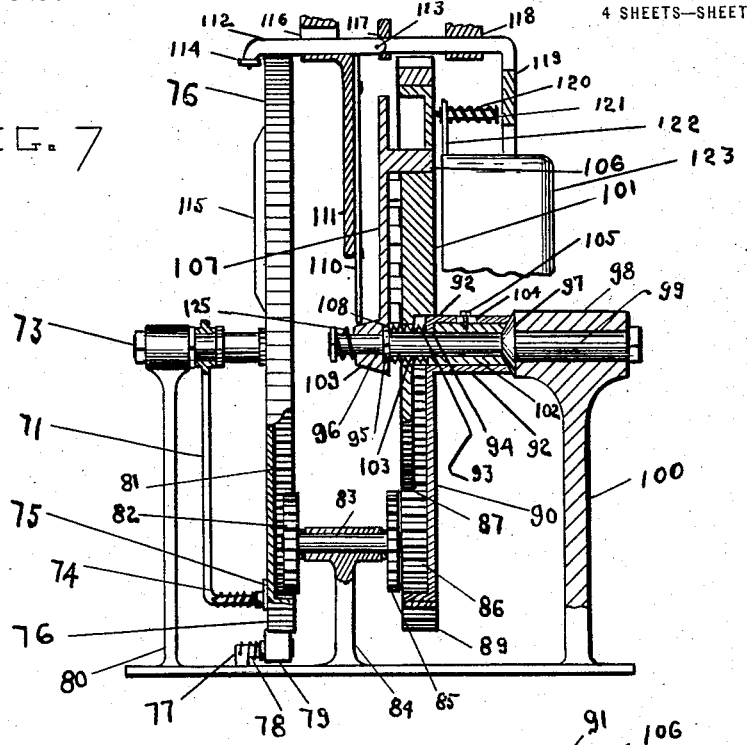
FIG. 7
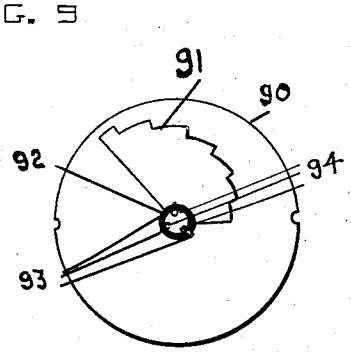
FIG. 9
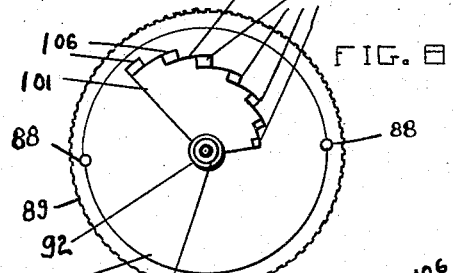
FIG. 8
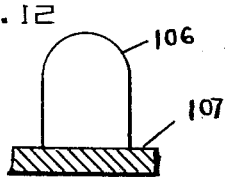
FIG. 12
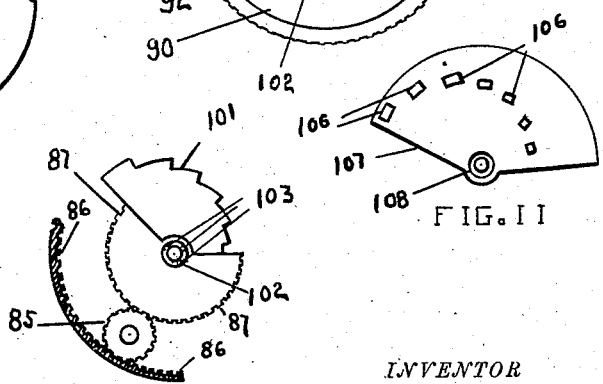
FIG. 10
FIG. 11
WITNESSES:
O. H. Rauch
Gladys Jameson.
INVENTOR
Geo. E. Kirk
THE COLUMBIA PLANOGRAPH CO., WASHINGTON, D. C.

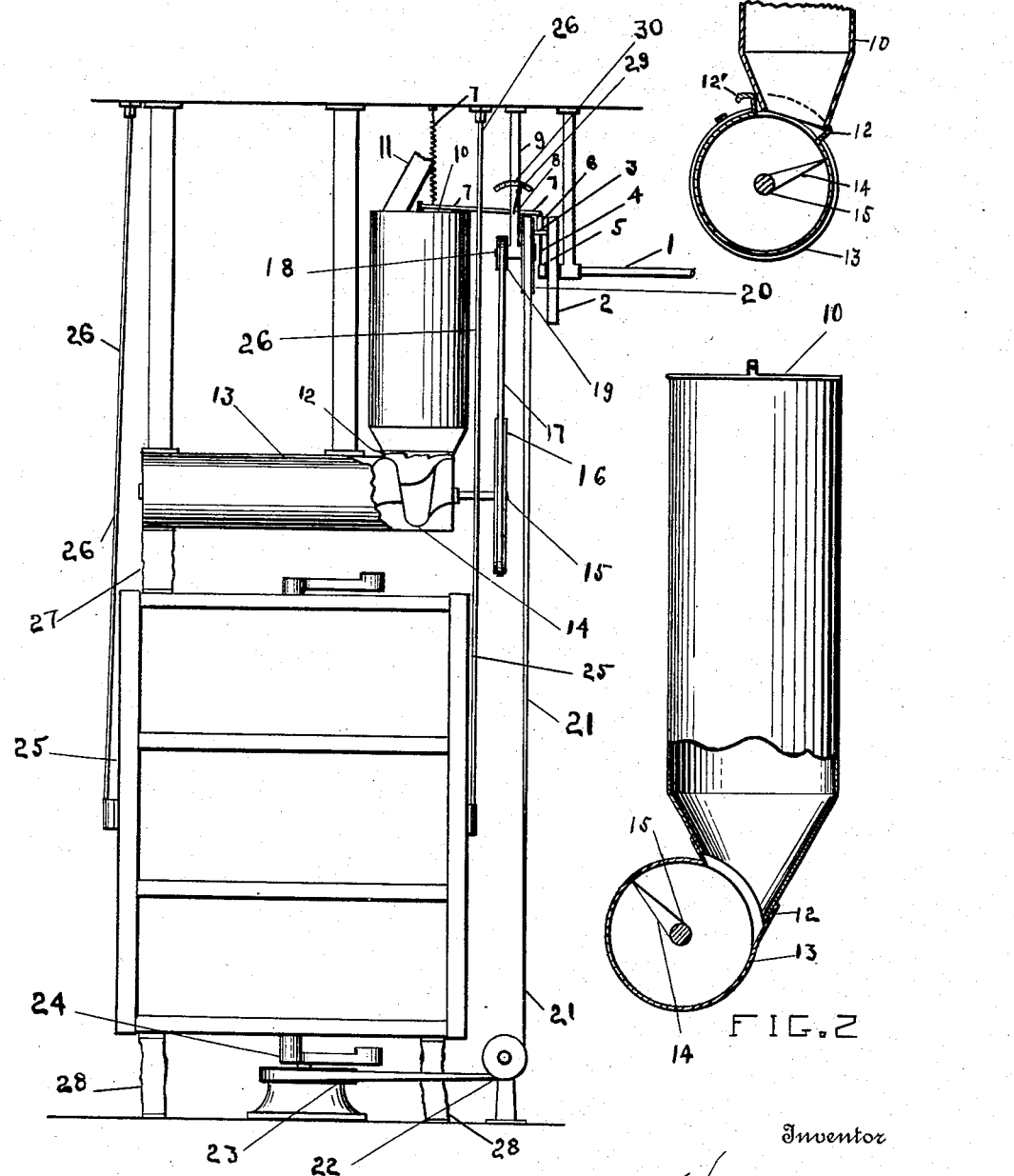

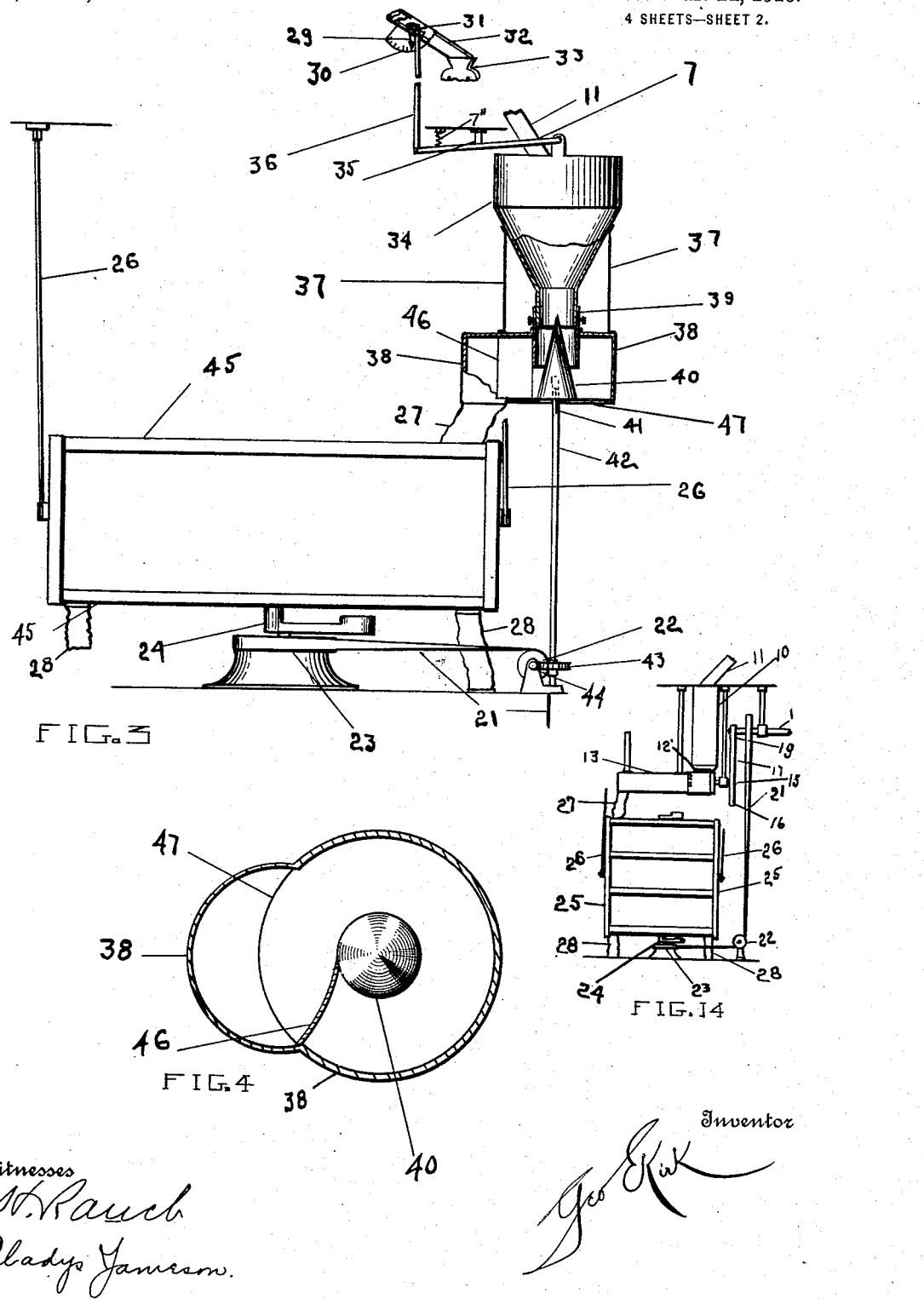

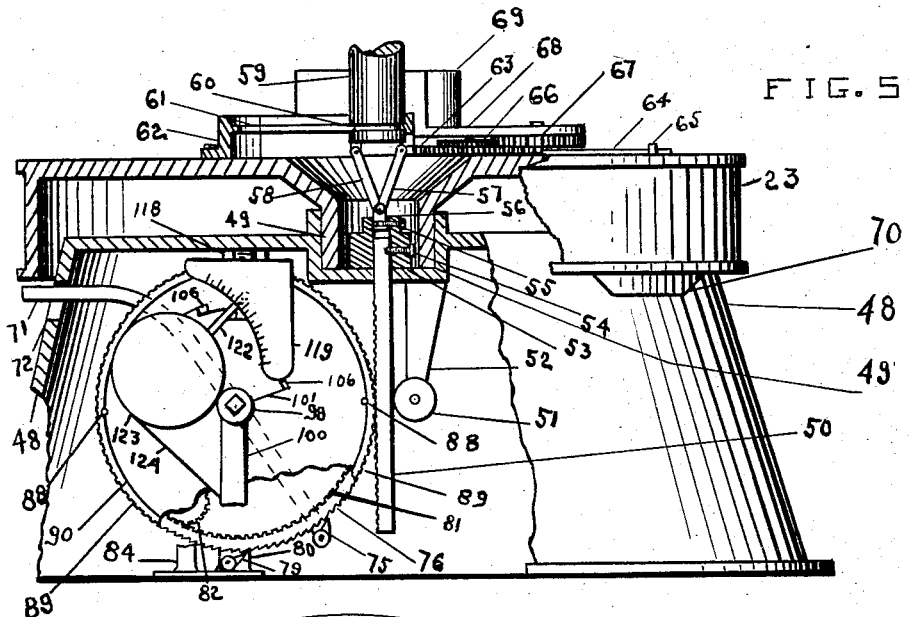
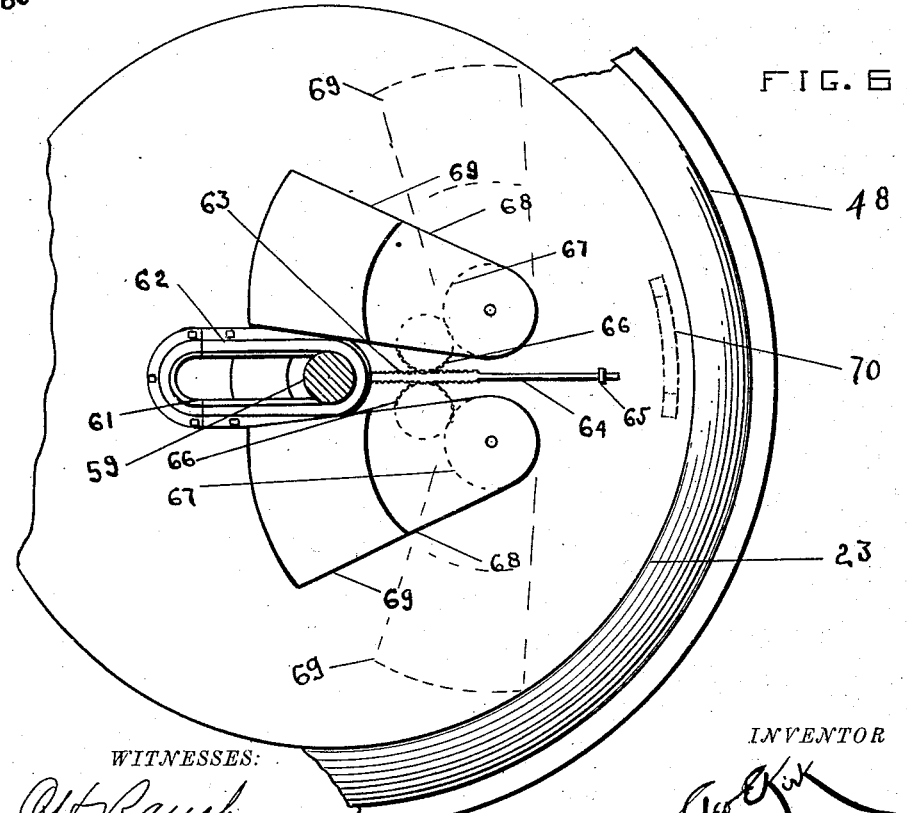

UNITED STATES PATENT OFFICE.

GEORGE E. KIRK, OF TOLEDO, OHIO.

HUMIDITY-GOVERNOR.

1,175,152.  Specification of Letters Patent.  Patented Mar. 14, 1916.

Application filed March 6, 1912. Serial No. 681,976.

*To all whom it may concern:*

Be it known that I, GEORGE E. KIRK, a citizen of the United States, residing at Toledo, Lucas county, Ohio, have invented a new and useful Humidity-Governor, of which the following is a specification.

This invention relates to automatic controlling mechanism.

This invention has utility when embodied in connection with handling or treating material acting differently under slight changes in moisture content, for instance the different breaks of wheat in flour manufacture.

Referring to the drawings: Figure 1 is a view in elevation of an embodiment of the invention in connection with a sifter for flour treatment; Fig. 2 is a detail view on an enlarged scale of a portion of the controlling mechanism affected by moisture; Fig. 3 is an elevation, with parts broken away of an embodiment of the invention in connection with flour manufacture in which the moisture content variation is used to control the supply to the grinding rolls, instead of to vary the speed of the sifter as shown in Fig. 1; Fig. 4 is a horizontal section on an enlarged scale of a portion of the controlling mechanism spill feature; Fig. 5 is a fragmentary view of a driver base having self contained moisture affected controlling mechanism, said base adapted to actuate a sifter, say as shown in Fig. 3, by varying the radius of gyration or shaking distance of the sifter; Fig. 6 is a fragmentary plan view of the device of Fig. 5; Fig. 7 is a detail view, partially in section, of the actuating connections of the mechanism of Fig. 5; Fig. 8 is a side view of the indicator affected disks grouped; Fig. 9 is a view of the outer indicator affected disk or lift feature, upward movement of which tends to increase sifter travel; Fig. 10 is a view of the inner indicator affected disk, showing driver therefor and for the outer disk; Fig. 11 is a view of the trip disk; Fig. 12 is a fragmentary detail of the trip disk showing a lug thereof in elevation as seen looking radially of the disk; Fig. 13 is a view similar to Fig. 2, but showing handle 12' to shift by rotating the intake to the conveyer and thus change effect of angle of repose variation for different stocks; and Fig. 14 is a view thereof embodied with a sifter and not having the speed variation of Fig. 1 incorporated therein.

The driving shaft 1, Fig. 1, has the friction face driving pulley 2 coacting with the friction wheel 3, slidable radially of the wheel 2 along guide 4 mounted by the collar 5 on the shaft 1. The friction wheel 3 is reciprocated by the sleeve 6 carried by the lever 7 having the fulcrum 8 in the bracket 9. The remote end of the lever 7 is connected to the hopper 10 into which the chute 11 discharges the material to be treated.

The hopper 10 is freely mounted for reciprocation with its discharge funnel slidable in the sleeve 12 of the housing 13 of the scroll conveyer 14 driven by shaft 15 having the pulley 16 actuated by the belt 17 from shaft 18 having the small pulley 19 to cause the scroll to be driven at a reduced speed from the pulley 20 eccentrically disposed as to shaft 1 and driven by the friction wheel 3.

The pulley 20 by means of the belt 21 passing over the idlers 22 actuates the pulley 23 to rotate the gyrator crank 24 connected to the sifter 25 freely suspended for movement of gyration by the reeds 26. The continuous flow of material from the chute 11 into the hopper 10 runs to the conveyer 14 from which it discharges through the stocking 27 into the sifter 25 for separations taken from the sifter by the stockings 28.

The reciprocable action of the hopper 10 may be adjusted by the spring 7', while the pointer 29 rocking with the lever 7 over the scale 30 indicates the moisture condition of the material.

Flour is susceptible to change in its moisture content due to atmospheric moisture, and this change in the flour varies its angle of repose, and with sifter set for one condition of running, say for a dry day, then with increase in moisture, the stock loads up in the sifter and tails off high grade product which should go into separations, to save which it is necessary to rerun the tailings, or re-adjust the treatment to insure proper separation. This variation in the angle of repose is automatically taken into account by the device of this disclosure, in that the angle being greater upon increase of moisture content, with constant feed into the hopper 10, the conveyer 14 removes less stock to the sifter, resulting in accumulation of stock in the hopper 10, the loading down of which causes a settling, with consequent lifting of the friction wheel 3 to increase the speed of pulley 20 as to pulley 2. This speeding up increases the vibrations or gyrations of the sifter 25, per minute, as also the rate of rotation of conveyer 14, to accordingly bring about a reduction in the accumulation of stock in the hopper 10. The spring 7' may be adjusted to take care of normal load conditions in the hopper 10, while the pitch of the conveyer 14 and its feed rate is proportioned to the capacity of the sifter 25. As so constructed the variations in atmospheric moisture, directly affecting the stock being handled, automatically act as a controller or humidity governor to increase the action upon the material as the moisture increases, and decrease the action of the treating device upon the material as the moisture content falls.

The invention as embodied in the disclosure of Fig. 3, has adjacent the indicator pointer 29 and mounted on the axis therewith to be varied as the pointer moves over the scale 30, the gate 31 in the chute 32 to the grinding rolls 33 from which the breaks pass to the chute 11 and also the hopper 34, non-rotatable, and suspended by lever 7 mounted in the fulcrum bracket 35, connected by the link 36 to actuate the gate 31 as the hopper 34 is reciprocated by the varying load of stock therein. Carried by the brackets 37 from the hopper 34, is the housing 38 having adjustable sleeve 39 to vary the spill opening about the cone 40, engaged by the spline 41 to be rotated by the shaft 42 driven by the worm wheel 43 from the worm 44 actuated by the idlers 22 driven by the belt 21 passing around the pulley 23 to operate the gyrator crank 24 of the sifter 45, freely suspended by the rods 26 for gyration. In the housing 38 is the scraper or vane 46 held with said housing 38 and hopper 34 against rotation, so that in the rotation of the cone 40 and its platform 47, the spill of stock from the hopper 34 is scraped off to fall into stocking 27 for delivery to the sifter 45, separation therein, and passing off through the stockings 28. Adjustment of the spring 7'' is such as to take care of the normal loading of the hopper 34, and adjustment of the sleeve 39 and the speed reduction is proportioned to take care of the capacity of the sifter 45.

As the angle of repose of the stock being treated varies, due to its change in moisture content, there is change in the quantity deposited upon the platform 47, and accordingly as this deposit is scraped off by the vane 46, there is a variation in the material supplied to the sifter 45. With increase in moisture content of the material, the delivery is reduced with resulting accumulation in the hopper 34, which in settling down reduces the flow of material by partially closing the gate 31, by raising it to close the chute 32, or partially close said chute. With this reduction in the flow stream, there is accordingly permitted increased action of the device upon the material of the flow, to bring the treatment to normal. In this disclosure, as well as in the disclosure of Fig. 1, a reduction in the moisture content of the material, as due to drier atmospheric condition, brings about a reversal of the operations recited.

While the humidity governor or controlling mechanism as above described is in each instance using the material itself, as the factor entering into the operation, there may be an adaptation, for instance by use of some other moisture susceptible factor, as a hygrometer. A self contained mechanical adaptation is shown in Fig. 5 wherein the base 48 is provided with a bearing 49 for the driving pulley 23. Centrally disposed in said housing 48 is the rack 50 held in position by the roller 51 in the bracket 52. This rack 50 is anchored in the block 53 by the bolt 54. Rotatable in the upper part of this block 53 disposed in the bearing 49, is the head 56 held by the bolt 55. Extending from this head 56 rotatable with the pulley 23, is a pair of links 57, 58. The link 58 is connected to the sifter shaft or trunnion 59. In this shaft 59 is the groove 60 engaging the rib 61 in the frame 62 on the upper web of the pulley 23. This frame is oval to permit radial travel of the shaft 59. The link 57 is connected to the double rack 63 having the extension 64 passing through the guide 65 in the upper side of the web of the pulley 23. Meshing with the rack 36 is a pair of gears 66 coacting with the gears 67 on the arms 68 to throw the pair of weights 69 out as the shaft 59 assumes an eccentric travel, the proportioning of which weights may be such as to normally balance the sifter under load.

Mounted on the lower side of the rim of the pulley 23 is the cam 70, which in the rotation of the pulley 23 strikes the lever 71 protruding from the opening 72 in the base 48. This lever 71 (Fig. 7) is mounted on the shaft 73, and carries at its lower end the spring 74 normally forcing the pawl 75 into engagement with the ratchet wheel 76, also mounted on the shaft 73. As a lock against back action of the ratchet wheel 76 as intermittently urged forward by the pawl 75, regardless of the direction of rotation of the wheel 23, there is provided the bracket 77 carrying the coil spring 78 normally holding the locking pawl 79 against the teeth of the ratchet wheel 76. The shaft 73 upon which are loosely mounted the lever 71 and the ratchet wheel 76, is mounted in the bracket 80.

The ratchet wheel 76 carries annular gear 81 in mesh with which is the pinion 82 fast on the shaft 83 mounted in the bracket 84 adjacent the side of the wheel 76 opposite the lever 71. Fast to the opposite end of the shaft 83 is the pinion 85, normally out of mesh with the annular gear 86 and toothed segment 87, either of which may be thrust in mesh therewith. The annular gear 86 is splined by the pins 88 to insure rotation with the gear 89 in mesh with the rack 50, but free for lateral reciprocation of its indicator affected disk 90 which has the irregular opening 91 therein and the central sleeve 92. The springs 93 acting against the inwardly extending projections 94, force the sleeve 92 (Figs. 7, 9) away from the collar 95 fixed on the shaft 96 to lock the disk 90 with its connected gear 89 against rotation by engagement with the friction cone clutch 97 disposed against the bearing 98 carrying the shaft 99 splined therein, said shaft bearing being mounted in the bracket 100.

The gear segment 87 has protruding indicator segment disk 101 of irregular form for positioning in the opening 91 with clearance between the steps thereof. The segment 87 is also provided with the central sleeve 102 forced by the springs 103 (Figs. 7, 10) coacting against the collar 95 to engage the friction cone clutch 97. In the slot 104 in the sleeve 92 is the bolt 105 engaging the sleeve 102, the bolt being approximately midway of the slot, so that as either sleeve 92 or 102 approaches its limit of movement away from the cone clutch 97, the bolt picks up the other sleeve to unclutch the two indicator affected disks for simultaneous rotation.

Fitting into the openings between the steps of the opening 91 in the disk 90 and the projection 101 are the projections or lugs 106 of the trip disk 107 which has the recess 108 for the collar 95 fixed to the shaft 96. Extending away from the recess 108 on the opposite side of the disk 107 is the cone 109 upon which in its rotation may ride the pin 110 reciprocable in the guide 111. As the disk 107 in its rotation is thrust away from the collar 95, the pin 110 is forced upward by the cone 109, causing the arm 112 to swing upward upon its pivot 113 and thus pull the roller 114 off the cam 115 on the ratchet wheel 76. The recess 116 allows of the upward swing of this tripping action, while the guides 117 and 118, mounted on the under side of the top of the base 48, confine the movement of the indicator member 119 to reciprocation as the released parts are thrust back by the spring 120 surrounding the pin 121 carried by the indicator pointer 122 of the hygrometer 123 carried by the bracket 124. The springs 93 hold the disk 90 toward clutch 97. The springs 103 (Figs. 7, 10) hold the disk 101 against the clutch 97. These disks 90 and 101 are accordingly held clutched in a common plane for the action of the pin 121, while in the openings therebetween extend the projections 106 of the disk 107, held therein by the spring 125.

In operation, the hygrometer 123 has its pointer 122 free to act and indicate moisture conditions upon the graduations on the member 119. At each rotation of the wheel 76, the cam 115 engages the roller 114, to cause the arm 112 to pull the indicator member 119 against the pin 121. The disposal of the indicator 119 is such as to cover the arc of movement of the pointer 122. The axis of this pointer and the configurations of the indicator affected disks are such that there is proportionate movement to a mean position in regular operation, the mean position approximating vertical in Fig. 5.

With the parts in the position shown in Fig. 5, the action of the cam 115 will force the pin 121 against the disk 90, causing it to slide free of the clutch 97, and then through the bolt 105 just move the inner sleeve 102 free thereof, but this inner sleeve movement is not sufficient to bring the segment 87 in mesh with the pinion 85, but is sufficient as to disk 90 to bring the gear 86 into mesh with this gear or pinion 85, as the gear 86 slides on its splines 88. The continued travel of the ratchet wheel 76 causes the gear 85 to drive the annular gear 86 and with it the gear 89 to bring about a lift movement of the rack 50 and thus increase the radius of travel in gyration of the shaft 59 of the sifter, as well as simultaneously throw outward the counterbalancing fly-weights 69. While these fly-weights 69 are shown in total withdrawn position, in normal operation, there would be some spread thereof, say as shown in dotted lines in Fig. 6, from which normal position the action of increased moisture is shown as bringing about an increase in the action of the device upon the material treated in its continuous flow through the sifter actuated by the shaft 59. The anti-friction head of the pin 121 rides upon the face of the disk 90 during this shifting of the shaft 59 and the weights 69. As this adjusting movement approximates the computed or proportionate amount according to the moisture change, capacity of the machine and character of the stock being handled, the pin 121 rides up the curved shoulder of the projection 106, shown above the pointer 122 in Fig. 5. This action forces the projection 106, with the plate 107 against the spring 125, causing the cone 109 to push the slide 110 and throw the arm 112 to remove the roller 114 from the cam 115, thus allowing the spring 120 to withdrawn the pin 121 and reset the indicator 119. As the pin 121 rides off the disk 90, the springs 93 at once throw the gear 89 into locked position by engaging the clutch 97, so that the shaft 59 and the fly-weights 69 are held in the adjusted position. The cam 115 is of sufficient length to hold the parts in driving relation to effect normal variations of adjustment of moisture condition changes.

Should there be no change in the indication in the next time around of the cam 115, the pressing inward of the pin 121 will at once act upon projection 106 to effect tripping, the arm 112 allowing the roller 114 to fall and ride upon the cam 115 until the cam passes, after which it falls still farther to be in the path of the cam in its next circuit. As long as there is no change in the moisture indication, these trip-offs will occur at such intervals as the speed reduction operates to bring the cam 115 into action.

Instead of moisture indication remaining stationary, or of increasing moisture content, it may be considered as recording or indicating increased dryness, with movement of the pointer 122 downward, so that the action of the cam 115 forces the pin 121 against the face of the disk 101, which moves along the shaft 96 against the resistance of the springs 103, and during the latter portion of its travel, has the bolt 105 just pull the sleeve 92 off the clutch 97. The disk 101, by its movement being fully unclutched, is also thrust into mesh as to its segment 87 with the pinion 85, while the movement of the disk 90 is insufficient to throw it into such meshing relation. The driving of the segment 87 by the pinion 85 is in the opposite direction to the action of the driving of the gear 86, and as the projecting disk face 101, as well as the bolt 105 spline the gear 86 to travel with the segment 87, there is opposite travel of the gear 89 to reduce the radius of vibration or gyration of the shaft 59 and simultaneously draw inward the fly-weights 69. In this adjusting operation, as the disks move back, the pin 121 rides off, as the adjustment is effected, intercepting a projection 106 to trip. There is accordingly provided a connection controlled by the moisture to govern the treatment of material. With the device of this disclosure, it is possible to effect adjustments requiring use of considerable power, which adjustments are suggested by an instrument not supplying such power, thus allowing use of a delicate indicator of moisture, or hygrometer.

A maximum of simplicity in control may be attained herein from the screw conveyer feed in which the hopper discharges thereinto in such manner as to vary supply to the conveyer as the angle of repose changes. With the supply somewhat lateral, as shown in Fig. 2, this variation is attained, and with the conveyer speeding with the sifter for rating of common capacity of barrels per hour, there is automatic reduction in quantity of stock delivered per rotation of the conveyer as the moisture increases, thus insuring less stock supplied to the sifter per vibration or gyration, and accordingly providing a safeguard for proper separation action. It is thus apparent that there is humidity governing by these elements. The introduction of the speed change feature shown in Fig. 1, permits an increase in the capacity per hour of the sifter to insure the sifter taking care of its proportion of the flow in the mill, instead of allowing the accumulation to remain in a hopper 10 of sufficient capacity and be taken care of by extra running of this sifter 25 or the introduction of an additional capacity as another element for such purpose. A conveyer having its speed rate for handling 10 barrels per hour may be connected to feed to a device for treating material, as a sifter having a capacity of 10 barrels per hour, and the delivery hopper to the conveyer be offset sufficiently so that supply of stock is reduced by the change in the angle of repose in just the same proportion as the stock in the separations of the sifter run heavy or clog with increase in moisture content. This delivery passage from the hopper to the conveyer is a moisture varied device, and the action of the material handling conveyer is controlled thereby in having its handling rate per revolution reduced. With less stock per rotation of the conveyer and accordingly less stock per gyration for the sifter, there is accordingly a proportionate increase in the action of the sifter upon the stock delivered thereto. To permit adjustment of the intake to vary readily the length of the angle of repose for handling different stocks, the intake 12 may be adjusted by moving the handle 12' and then bolting the rotatable housing section of the scroll, or locking it by set screw in the desired adjusted position.

In the disclosure of Fig. 5, and Fig. 6, when the fly weights 69 are in the normal dotted line running position, the connection of link 58 will extend to the shaft 59 in an eccentric position as to the pulley 23, and the connection of this link 58 to the shaft 59 may be swiveled to permit relative rotation therebetween, in the event shaft 57 is fixed against rotation in the sifter.

Should the sifter be running at normal, or any treating rate for which it may be adjusted, with decrease in the moisture, the stock would be over-sifted, say to run brown in separations, by allowing some of the low grade to mingle with the higher grade product, and this by working through the sieves.

What is claimed and it is desired to secure by Letters Patent is:

1. A controller comprising a mechanism actuated by change in the moisture content of the atmosphere, a treating device, driving means for the device, and connections to vary the action of the driving means as the mechanism changes.

2. A sifter, atmospheric moisture operated mechanism, and connections from the mechanism to vary the action of the sifter according to the amount of moisture in the material treated.

3. A device for treating a continuous flow of material, atmospheric moisture varied mechanism, and connections from the mechanism to increase the action of the device on the material as the atmospheric moisture increases.

4. A device for treating material the flow angle of which increases with its moisture content, and mechanism connected to increase the action of the device upon the material as the moisture content of the material rises.

5. A device for treating material the flow angle of which varies with its moisture content, and mechanism connected to decrease the action of the device as the moisture content falls.

6. A vibrating device for treating material of variable moisture content, driving means for the device, and mechanism connected to control the means to increase the action of the device upon the material as the moisture content increases.

7. A device for effecting separation in a continuous flow of material supplied thereto, and a humidity governor for the device for regulating the separation even though the moisture content of the material supplied may vary.

8. A sifter, driving means therefor, and a humidity governor embodying mechanism for varying the action of said means on the sifter.

9. A humidity governor, a flour treating device, and connections from the governor to the device for positively varying the action of the device.

10. A moisture varied device for effecting separation in material supplied thereto, and material handling connections controlled by the device for producing separations of material into grades which are uniform even though the moisture content of the material supplied may vary.

11. A device for treating a continuous stream of material the flow angle of which varies, driving mechanism for the device, and controlling means for increasing the action of the device upon the material stream as the flow angle of the material rises.

12. A device for treating material, atmospheric moisture varied mechanism for the device, and connections from the mechanism to increase the action of the device on the material as the moisture content varies, said connections embodying a plurality of adjustments and means for shifting the adjustments.

13. A device for treating material to a greater change producing action as the moisture in the material increases, a humidity governor, and connections from the governor to the device for increasing and decreasing the action of the device upon the material directly as the moisture changes.

14. A device for handling material susceptible to taking up moisture, a humidity governor, and connections from the governor to the device for increasing the effective action of the device as to the material as the moisture taken up by the material increases.

15. A device for handling material including a receiver for the material, a supply device for the receiver disposed for angle-of-repose restriction of the material discharge volume to congest the supply device, and control connections from the supply device actuable by the congestion therein.

16. A device for handling material including a receiver for the material, a supply device for slant discharge of material to the receiver, varying with the angle of repose of the material, and driving means for removing the material from the receiver in angle-of-repose varied volume.

17. A device for handling material including a horizontally disposed scroll conveyer, driving means for the conveyer, supply means for charging the conveyer with angle-of-repose restriction of such charging for automatically varying the conveyer delivery, and treating means for the material for which the conveyer in itself regulates the material supply.

18. A device for handling at a determined rate substances susceptible to varying moisture content, a humidity governor, and connections from the governor to the device for modifying the rate of handling the substances.

19. A mechanism for supplying at a determined rate a flowing substance to be acted upon, flow rate modifying means decreasing the substance flow as its moisture content increases, and a flow rate readjusting device for the substance as to the mechanism, said device controlled by the means.

In testimony whereof I hereunto set my hand in the presence of two witnesses.

GEO. E. KIRK.

Witnesses:
C. H. RAUCH,
GLADYS JAMESON.

Copies of this patent may be obtained for five cents each, by addressing the "Commissioner of Patents, Washington, D. C."